United States Patent Office 2,999,884
Patented Sept. 12, 1961

2,999,884
PROCESS FOR PREPARING A POLYFLUORO ALKANOL
Viktor Weinmayr, Landenberg, Pa., assignor to E. I. du Pont de Nemours and Company, Wilmington, Del., a corporation of Delaware
No Drawing. Filed May 20, 1959, Ser. No. 814,386
6 Claims. (Cl. 260—633)

This invention relates to a novel process for preparing 1H,1H-2-(trifluoromethyl)-tetrafluoro-1-propanol.

The 1H,1H-2-(trifluoromethyl)-tetrafluoro-1- propanol, having the formula

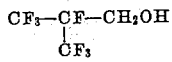

is a member of a class of alcohols which are well known compounds that are valuable for many purposes, particularly as intermediates for the preparation of other compounds containing a polyfluoro alkyl group such as esters, including polymerizable esters, derivatives having low surface tension, dyes, insecticides and medicinals.

The methods heretofore used for the preparation of polyfluoroalkanols are complex and hazardous and require high-cost starting materials. For example, polyfluoroalkanols have been made by reducing perfluoroalkanecarboxylic acids with lithium aluminum hydride as disclosed by Husted et al. in J.A.C.S. 74, 5422 (1955) and from perfluoro aliphatic aldehydes by reaction with Grignard reagents as disclosed by McBee et al. in J.A.C.S. 74, 1736 (1955). 1H,1H-polyfluoroalkanols have also been prepared by electrolyzing solutions of alkanecarboxylic acids in hydrogen fluoride, followed by reduction of the intermediate polyfluoroalkanecarboxylic acids to the corresponding polyfluoroalkanols as disclosed by Husted et al. in Patent 2,666,797.

It is an object of this invention to provide a new and improved process for the preparation of 1H,1H-2-(trifluoromethyl)-tetrafluoro-1-propanol. Another object is to provide such a process which can be readily carried out, which employs readily available starting materials, and produces the desired product in high yield and high purity, and which can be practiced on a large scale without undue hazards. Other objects are to advance the art. Still other objects will appear hereinafter.

The above and other objects may be accomplished in accordance with this invention which comprises reacting about 0.5 mole of hexafluoropropylene with 1 mole formaldehyde, which may be in polymeric form, and at least 2 moles of hydrogen fluoride at a temperature in the range of from 100° C. to 200° C. and a pressure in the range of from about 600 p.s.i.g. to about 2500 p.s.i.g., there being present not more than 1 part of water for each part of hydrogen fluoride, and separating from the reaction mass 1H,1H-2-(trifluoromethyl)-tetrafluoro-1-propanol.

The process of this invention is simple and readily carried out in conventional reaction vessels that may be heated and agitated and which will withstand the pressures encountered in the reaction. The reaction vessel will be constructed of or lined with a material or materials that is resistant to the corrosive action of anhydrous hydrogen fluoride and/or concentrated solutions of hydrofluoric acid. suitable materials of construction include platinum, silver, nickel, stainless steel and "Hastelloy."

The process may be carried out as a batch process with the intermittent addition of hexafluoropropylene to a solution of formaldehyde or of a polymer thereof in hydrogen fluoride or with the intermittent addition of a solution of the formaldehyde or of its polymer in hydrogen fluoride to a charge of hexafluoropropylene, or as a continuous operation. In a continuous operation, for example, a stream of a solution of paraformaldehyde in anhydrous hydrogen fluoride and a stream of hexafluoropropylene will be continuously introduced simultaneously into a reaction vessel maintained at the required reaction temperature and pressure, and a solution of the reaction products in hydrogen fluoride will be continuously withdrawn for continuous isolation of the products.

In a batch or intermittent process, the manner in which the hexafluoropropylene is brought into contact with the formaldehyde solution in hydrogen fluoride may be varied widely without significantly changing the over-all results. The reaction may be run under a constant hexafluoropropylene pressure, the amount of hexafluoropropylene to be employed may be charged in a single batch to the reaction vessel at the start of the operation, or hexafluoropropylene may be added intermittently, allowing the pressure to drop after each addition thereof, until no decrease in pressure with a subsequent addition of hexafluoropropylene indicates that the reaction is complete. The presently preferred process comprises heating a 20% to 25% solution of paraformaldehyde in anhydrous hydrogen fluoride to 155° C. to 165° C. and, at this temperature with constant agitation, maintaining a pressure of about 2000 p.s.i.g. to about 2100 p.s.i.g. with hexafluoropropylene for 2 to 24 hours.

The 1H,1H-2-(trifluoromethyl)-tetrafluoro-1-propanol may be isolated from the reaction mass in a number of ways which are described hereinafter in some detail.

Atmospheric oxygen tends to initiate self-polymerization of the hexafluoropropylene. To prevent the possibility of such self-polymerization, the reaction usually should be carried out in the substantial absence of air. Therefore, the equipment should be carefully flushed with an inert gas, such as nitrogen, to remove air as far as practicable before the introduction of any reactant which is volatile at the temperature of the reaction vessel. For example, when paraformaldehyde is used, it may be charged to the vessel before the vessel is flushed with the inert gas. The reaction vessel can be charged with any or all of the reactants at a temperature at which they are substantially nonvolatile, prior to flushing it with the inert gas. Otherwise, the vessel should be flushed with the inert gas before charging the reactants. The air or atmospheric oxygen, which is normally present in the reactants in dissolved form, does not appear to be harmful.

It has been found so far that only tetrafluoroethylene and hexafluoropropylene will react with formaldehyde and hydrogen fluoride to form polyfluoroalkanols. When other polyfluoroolefins, such as hexafluorocyclobutene, perfluoroisobutylene, the dimer of hexafluoropropylene, the trimer of hexafluoropropylene, and 9H-polyfluoro-1-nonene, were employed in the place of hexafluoropropylene in the process of this invention, the expected polyfluoroalkanols could not be identified in the reaction mass. Tetrafluoroethylene requires different critical conditions and the process as applied thereto is disclosed and claimed in my copending application, Serial No. 814,415, filed May 20, 1959.

The hexafluoropropylene employed in this process may or may not contain a polymerization inhibitor. Usually it is preferred to employ the commercially available hexafluoropropylene which contains a polymerization inhibitor so as to ensure against any possible polymerization of the hexafluoropropylene. The presence of the polymerization inhibitor does not affect the reactivity of the hexafluoropropylene in this process or affect the yield or quality of the desired products.

The formaldehyde may be used in its unpolymerized form or in the form of one of its polymers, such as trioxane and paraformaldehyde, without affecting the rate or the course of the reaction. For ease of handling and for economic reasons, the formaldehyde ordinarily will be in the form of paraformaldehyde. Other aldehydes, such as acetaldehyde, paraldehyde (a polymeric form of acetaldehyde), and benzaldehyde were found to be inoperable in the process of this invention.

Preferably, the hydrogen fluoride will be anhydrous hydrogen fluoride. This is for practical reasons, such as keeping the corrosion of the equipment at a minimum. It is unnecessary to employ special precautions to maintain anhydrous conditions for the reaction to proceed satisfactorily. Aqueous hydrofluoric acid of 50% concentration or higher may be used. More dilute hydrofluoric acid tends to cause excessive corrosion of the equipment and excessive decrease in the yield of the desired product. The anhydrous hydrogen fluoride need not be completely pure, but commercial anhydrous hydrogen fluoride, which contains traces of sulfur compounds, is quite satisfactory.

Catalysts are not required for the reaction of the process of this invention, but the reaction takes place at satisfactory rates in the absence of any catalytic material. Such substances as sodium fluoride, mercuric oxide, boric acid anhydride, arsenic trioxide and phosphorous pentoxide were tested as possible catalysts but were found to have no influence on the course of the reaction or on the reaction rate.

The amount of hexafluoropropylene required for the reaction is 0.5 mole per mole of formaldehyde. Less than this amount of hexafluoropropylene results in a corresponding decrease in the production of the desired products from a given amount of formaldehyde, and more than this amount comprises an excess of hexafluoropropylene which must be recovered or will be wasted.

Although the stoichiometric equation for the reaction of this process requires only 1 mole of hydrogen fluoride for each mole of formaldehyde, it has been found that at least 2 moles of hydrogen fluoride for each mole of formaldehyde must be used. Materially smaller proportions of hydrogen fluoride fail to produce the desired reaction and product. Usually, there will be employed from about 3 to about 7 moles of hydrogen fluoride for each mole of formaldehyde, preferably 4 to 5 moles of hydrogen fluoride. Much larger excesses of hydrogen fluoride may be used, but such excesses provide no advantage and merely increase the problem of recovering the excess hydrogen fluoride.

The excess hydrogen fluoride and the 1H,1H-2-(trifluoromethyl)-tetrafluoro-1-propanol may be separated from the reaction mass by fractional distillation or by dilution with ice and neutralization followed by distillation. If it is desired to obtain directly from the reaction mass a clean separation of hydrogen fluoride and substantially pure 1H,1H-2-(trifluoromethyl)-tetrafluoro-1-propanol by a fractional distillation, the reaction may be carried out in the presence of concentrated sulfuric acid or, preferably, concentrated sulfuric acid will be added after the reaction has taken place, followed by fractional distillation of the mixture.

If the reaction is carried out in the presence of concentrated sulfuric acid, the acid used should be of about 96% to 100% concentration, employing at least about 5% by weight of the concentrated acid based on the total weight of the other reactants. Usually, the concentrated sulfuric acid will be present in the proportion of from about 20% to about 50% by weight and preferably from about 20% to about 30% by weight. The concentrated sulfuric acid has the advantage that, when the reaction mass is fractionally distilled, the excess hydrogen fluoride, in substantially pure anhydrous form, and essentially pure anhydrous 1H,1H-2-(trifluoromethyl)-tetrafluoro-1-propanol, substantially free from hydrogen fluoride, are readily obtained as separate fractions.

The concentrated sulfuric acid may be added to the reaction mass, after the hexafluoropropylene/formaldehyde/hydrogen fluoride reaction has taken place, with the same effect of producing a cleaner separation of the hydrogen fluoride and the alcohol during the distillation, yielding the alcohol substantially free of hydrogen fluoride. However, in the latter case, the sulfuric acid should be in a proportion of at least 20% by weight of the reaction mixture treated, usually from about 20% to about 50% and preferably from about 30% to about 40%.

The reaction may be carried out at a temperature in the range of from 100° C. to 200° C. For a smooth, controlled reaction with high conversion and yield, the temperatures usually will be in the range of from about 125° C. to about 165° C., preferably from about 155° C. to about 165° C. As the temperatures are increased above 200° C. there is an increased tendency for the formation of undesirable by-products which cause a corresponding reduction in the yield of the desired product.

The pressure usually will depend partly upon the amount of hexafluoropropylene charged to the reaction vessel and present at any given stage of the reaction and partly upon the temperature at which the reaction is run. The pressure may range from about 600 p.s.i.g. (pounds per square inch gauge), to about 2500 p.s.i.g. Usually, the pressure will be the autogenous pressure at the temperature employed. At temperatures in the range of from about 125° C. to about 165° C. the preferred pressure is from about 925 p.s.i.g. to about 2100 p.s.i.g. The pressures can be independently increased further by compression or by introduction of the hexafluoropropylene or of an inert gas such as nitrogen under the desired pressure. With little or no excess of hexafluoropropylene over the stoichiometric amount, the pressure decreases during the reaction as the hexafluoropropylene is consumed.

In order to more clearly illustrate this invention, presently preferred modes of carrying it into effect and advantageous results obtained, the following examples are given in which the proportions are by weight except where specifically indicated otherwise.

*Example 1*

A 500 cc. stainless steel reaction vessel cooled to −60° C. was charged with 30 parts of paraformaldehyde, flushed with nitrogen, and 200 parts of anhydrous hydrogen fluoride and 160 parts of hexafluoropropylene were added. The reactor was then closed, heated to 160° C., and maintained at this temperature for 8 hours. The pressure on the system at 160° C. was about 2000 p.s.i.g. At the end of the reaction period, the reactor was cooled. The reaction mass was poured onto about 2000 parts of crushed ice and made slightly alkaline to litmus with ammonia gas. Upon steam distillation, 28 parts of a water-insoluble material formed as a lower layer in the distillate. This product was fractionated, distilling at 94.5° C., and identified by infrared analysis and nuclear magnetic resonance as 1H,1H-2-(trifluoromethyl)-tetrafluoro-1-propanol.

*Example 2*

By the procedure of Example 1, 60 g. of paraformaldehyde, 200 g. of hydrogen fluoride, and 160 g. of hexafluoropropylene were heated for 8 hours at 160° C. The maximum recorded pressure was 2100 p.s.i.g. Twenty grams of steam distilled, unrefined 1H,1H-2-(trifluoromethyl)-tetrafluoro-1-propanol were obtained.

*Example 3*

The same charge of reactants used in Example 2 was heated for 12 hours at 125° C. The maximum recorded pressure was 925 p.s.i.g., and the yield of unrefined 1H,1H-2-(trifluoromethyl)-tetrafluoro-1-propanol was 10 grams.

It will be understood that the preceding examples have been given for illustrative purposes solely and that this invention is not limited to the specific embodiments disclosed therein. On the other hand, it will be readily apparent to those skilled in the art that, subject to the limitations set forth in the general description, the materials, proportions of materials, conditions and techniques employed may be widely varied without departing from the spirit or scope of this invention.

From the foregoing description, it will be apparent that this invention provides a new and improved process for making 1H,1H-2-(trifluoromethyl)-tetrafluoro-1-propanol, which process uses readily available starting materials and produces the desired product in high yields and high purity. It is simple and easy to operate and control and can be practiced on a large scale without undue hazards. Therefore, it will be apparent that this invention constitutes a valuable advance in and contribution to the art.

The embodiments of the invention in which an exclusive property or privilege is claimed are defined as follows:

1. The process which comprises reacting about 0.5 mole of hexafluoropropylene with 1 mole formaldehyde and at least 2 moles of hydrogen fluoride at a temperature in the range of from 100° C. to 200° C. and a pressure in the range of from about 600 p.s.i.g. to about 2500 p.s.i.g., there being present not more than 1 part of water for each part of hydrogen fluoride, and separating from the reaction mass 1H,1H-2-(trifluoromethyl)-tetrafluoro-1-propanol.

2. The process which comprises reacting about 0.5 mole of hexafluoropropylene with 1 mole formaldehyde and at least 2 moles of anhydrous hydrogen fluoride at a temperature in the range of from 100° C. to 200° C. and a pressure in the range of from about 600 p.s.i.g. to about 2500 p.s.i.g. and separating from the reaction mass 1H,1H-2-(trifluoromethyl)-tetrafluoro-1-propanol.

3. The process which comprises reacting in the substantial absence of air about 0.5 mole of hexafluoropropylene with 1 mole formaldehyde and from about 4 to about 5 moles of anhydrous hydrogen fluoride at a temperature in the range of from about 125° C. to about 165° C. and a pressure in the range of from about 925 p.s.i.g. to about 2100 p.s.i.g. and separating from the reaction mass 1H,1H-2-(trifluoromethyl)-tetrafluoro-1-propanol.

4. The process which comprises reacting in the presence of sulfuric acid of from about 96% to 100% concentration about 0.5 mole of hexafluoropropylene with 1 mole formaldehyde and at least 2 moles of anhydrous hydrogen fluoride at a temperature in the range of from 100° C. to 200° C. and a pressure in the range of from about 600 p.s.i.g. to about 2500 p.s.i.g., the concentrated sulfuric acid being present in a proportion of from about 5% to about 50% by weight of the other reactants, and separating from the reaction mass 1H,1H-2-(trifluoromethyl)-tetrafluoro-1-propanol.

5. The process which comprises reacting in the substantial absence of air and in the presence of sulfuric acid of from about 96% to 100% concentration about 0.5 mole of hexafluoropropylene with 1 mole formaldehyde and from about 3 to about 7 moles of anhydrous hydrogen fluoride at a temperature in the range of from about 125° C. to about 165° C. and a pressure in the range of from about 925 p.s.i.g. to about 2100 p.s.i.g., the concentrated sulfuric acid being present in a proportion of from about 20% to about 30% by weight of the other reactants, and separating from the reaction mass 1H,1H-2-(trifluoromethyl)-tetrafluoro-1-propanol.

6. The process which comprises reacting about 0.5 mole of hexafluoropropylene with 1 mole formaldehyde and at least 2 moles of anhydrous hydrogen fluoride at a temperature in the range of from 100° C. to 200° C. and a pressure in the range of from about 600 p.s.i.g. to about 2500 p.s.i.g., adding to the reaction mixture at least 20% by weight of sulfuric acid of from about 96% to 100% concentration, and fractionally distilling the mixture to separate the reaction products and recover substantially pure anhydrous 1H,1H-2-(trifluoromethyl)-tetrafluoro-1-propanol.

References Cited in the file of this patent
UNITED STATES PATENTS

| | | |
|---|---|---|
| 2,124,851 | Fitzky | July 26, 1938 |
| 2,461,906 | Londergan | Feb. 15, 1949 |